United States Patent [19]

Szczutkowski et al.

[11] Patent Number: 5,023,936

[45] Date of Patent: Jun. 11, 1991

[54] METHOD AND APPARATUS FOR EXTERNALLY DEFINING THE OPERATIONAL MODE OF A DIGITAL RADIO TRANSCEIVER

[75] Inventors: Craig F. Szczutkowski, Forest; Clyde R. Butler, Jr., Lynchburg, both of Va.

[73] Assignee: General Electric Company, Lynchburg, Va.

[21] Appl. No.: 390,257

[22] Filed: Aug. 7, 1989

[51] Int. Cl.$^5$ ............................................. H04B 1/38
[52] U.S. Cl. ..................................... 455/90; 455/128; 455/347
[58] Field of Search .................. 455/89, 90, 343, 347, 455/349, 351, 76

[56] References Cited

U.S. PATENT DOCUMENTS

| | | | |
|---|---|---|---|
| 3,959,610 | 5/1976 | Finnegan et al. | 455/89 |
| 4,247,951 | 1/1981 | Hattori et al. | 455/183 |
| 4,254,504 | 3/1981 | Lewis et al. | 455/76 |
| 4,378,551 | 3/1983 | Drapac | 340/311.1 |
| 4,392,135 | 7/1983 | Ohyagi | 340/825.44 |
| 4,484,355 | 11/1984 | Henke et al. | 455/76 |
| 4,510,623 | 4/1985 | Bonneau et al. | 455/181 |
| 4,525,865 | 6/1985 | Mears | 455/186 |
| 4,555,805 | 11/1985 | Talbot | 455/76 |
| 4,618,997 | 10/1986 | Imazeki et al. | 455/76 |
| 4,621,373 | 11/1986 | Hodsdon | 455/347 |
| 4,638,120 | 1/1987 | Herve | 178/22.08 |
| 4,688,261 | 8/1987 | Killoway et al. | 455/76 |
| 4,771,399 | 9/1988 | Snowden et al. | 364/900 |

OTHER PUBLICATIONS

NEC, *NEC Electronics U.S.A. Inc.*, "μPD7225 Intelligent Alphanumeric LCD Controller/Driver Technical Manual", pp. 10–13, GEMC Marketing, 08/07/89.
"Dyna T-A-C 6000X Universal Mobile Telephone", Motorola (1984).
Groh, "The uP: The Key to An Advanced Frequency Synthesized HF SSP Amateur Radio Transceiver", *IEEE Transactions on Consumer Electronics*, vol. CE-26 (1980).

*Primary Examiner*—Reinhard J. Eisenzopf
*Assistant Examiner*—Edward Urban
*Attorney, Agent, or Firm*—Nixon & Vanderhye

[57] ABSTRACT

Different digital radio transceiver front panel escutcheon plate assemblies are provided for different optional transceiver configurations. A digital signal controller which is part of the main transceiver circuitry is capable of performing any of various basic and option functions under control of program control instructions stored in an associated non-volatile memory. Subsets of those features are selectively disabled by irreversibly modifying the transceiver unit from the outside of the unit (e.g., by cutting certain PC board pathways through holes provided in the transceiver unit front panel). The controller enables (executes) portions of the program control instructions stored in its associated non-volatile memory and disables (does not execute) other portions of the stored program control instructions in response to detection of continuity/discontinuity over those certain pathways.

10 Claims, 8 Drawing Sheets

METHOD AND APPARATUS FOR EXTERNALLY DEFINING THE OPERATIONAL MODE OF A DIGITAL RADIO TRANSCEIVER

CROSS-REFERENCE TO RELATED APPLICATIONS

This application is related to the following commonly assigned U.S. patent applications:

Ser. No 07/390,254 of Hodsdon filed concurrently herewith; and

Ser. No. 07/390,242 Szczutkowski et al filed concurrently herewith.

The two patent applications identified above are hereby incorporated herein by reference.

This application is also related to copending commonly assigned U.S. patent application Ser. No. 07/183,212 filed Apr. 19, 1988 in the name of Ingham.

FIELD OF THE INVENTION

This invention is related to digital radio communications devices. More particularly, the invention relates to radio communications device security arrangements which permit a user to access standard communications functions (as well as additional functions the user requests at time of purchase of the radio) while preventing the user from accessing additional functions not requested at time of purchase. Still more particularly, the invention relates to software controlled digital radio transceivers which perform various functions under control of internally stored program control instructions, and arrangements for substantially irreversibly inhibiting certain such functions from operating based on minor transceiver modifications preferably made from the outside of the transceiver subsequent to time of manufacture.

BACKGROUND AND SUMMARY OF THE INVENTION

For marketing and other reasons, manufacturers of radio communications devices typically offer several different configurations for each "model" of communications product manufactured. A particular model of mobile radio transceiver may have a "basic" or minimal configuration but may optionally be provided with additional features at additional cost.

For example, a basic transceiver configuration may provide communications over a limited number of communications channels for basic radio transmitting and receiving functions required by all users. Some users may, however, have additional requirements requiring additional features—such as additional communications channels, receiver channel scanning, telephone access (DTMF) capability, etc. The ability of a manufacturer to provide such additional features increases the flexibility, versatility, desirability and range of applications of the product without penalizing purchasers of the basic configuration with increased cost. Purchasers of the basic model pay a minimum price for the minimal configuration, while users requiring additional features pay an increased price based on the number and type of options they require.

In the past, additional features were generally provided by incorporating additional components and circuitry into the transceiver. For example, channel scanning capability or additional operating channels were added by installing additional frequency selection circuitry. Similarly, DTMF (TOUCH TONE) capability required an additional tone generator circuit and associated keypad to be installed. Transceiver designers used modular architectures to accommodate additional plug-in modules.

An example of this design approach is the prior art "MLS" series radio transceivers manufactured for General Electric Company by Japan Radio Corp. These "MLS" transceivers include basic transceiver circuitry disposed within a housing. The front panel assembly of the transceiver housing is manufactured separately, and consists of a separable front panel "escutcheon" plate. Mechanically mounted to the escutcheon plate is a printed circuit board which plug-connects to the basic transceiver circuitry when the escutcheon plate is mechanically fastened to the housing. The escutcheon plate and associated printed circuit board thus comprises a module separable from the transceiver main housing and basic circuitry, this module including user controls, circuitry required to connect the user controls to the transceiver circuitry, and additional circuitry needed to perform the additional functions.

Since additional features in many cases require different additional user controls, different models of escutcheon plate modules were produced for the "MLS" series transceivers. In particular, the "MLS" transceiver was made available in several different versions, such as: (1) a two-channel "basic" version; (2) an 8-channel version with scan feature; (3) a 16-channel version without scan; and (4) a 16-channel version with scan feature. Different interchangeable escutcheon plates with different user control arrangements corresponding to these different transceiver versions were provided. The particular escutcheon plate/control panel installed on a particular "MLS" transceiver limited the transceiver features the user could access. For example, the escutcheon plate corresponding to the "MLS" transceiver version with 16-channel capability and no scan feature does not have a control to actuate the scan feature—preventing the user from obtaining the benefit of the scan feature. Similarly, the escutcheon plates corresponding to the 8-channel transceiver versions do not include user controls to access more than 8 channels.

Since all "MLS" transceivers included identical basic transceiver circuitry and main housing, reduced manufacturing costs and increased reliability derived from large scale manufacturing were obtained. Specific purchaser selected additional features could be provided in a particular unit simply by installing the appropriate escutcheon plate module—a procedure which could be performed in the field or at the distributor if desired. Incorporation of the circuitry performing the additional functions and user controls interacting with such circuitry within the same front panel escutcheon plate module permitted a transceiver to be reconfigured by simply "unplugging" one module and "plugging in" a different module (further increasing reliability and decreasing manufacturing costs).

Digital microprocessor controlled radio communications devices such as the "MLS" series transceiver are generally known, of course. The following is a (by no means exhaustive) listing of prior patents and publications generally relevant to the state of the art of so-called "digital radios":

U.S. Pat. No. 4,378,551—Drapac
U.S. Pat. No. 4,392,135—Ohyagi
U.S. Pat. No. 4,525,865—Mears U.S. Pat. No. 4,247,951—Hattori et al
U.S. Pat. No. 4,254,504—Lewis et al
U.S. Pat. No. 4,510,623—Bonneau et al
U.S. Pat. No. 4,688,261—Killoway et al
U.S. Pat. No. 4,618,997—Imazeki et al
U.S. Pat. No. 4,771,399—Snowden et al
U.S. Pat. No. 4,484,355—Henke et al
U.S. Pat. No. 4,555,805—Talbot
U.S. Pat. No. 4,638,120—Herve
"DYNA T-A-C 6000X Universal Mobile Telephone", Motorola (1984)
Groh, "The uP: The Key to an Advanced Frequency Synthesized HF SSP Amateur Radio Transceiver", *IEEE Transactions on Consumer Electronics* Vol. CE-26 (1980).

Such references teach controlling transceiver functions in addition to transceiver operating parameters (e.g., operating frequencies) in response to digital signals stored in a memory device. While older radio transceivers required additional circuitry to perform additional, optional functions such as channel scanning, tone activated squelch and the like, modern digital microprocessor controlled transceivers are capable of performing such additional functions under software control with little or no additional circuitry. For example, receiver channel scanning can be implemented by providing an enhanced receiver program control routine controlling the microprocessor to periodically monitor activity on various channels—and additional frequency data can be stored in a memory device to provide additional transceiver operating channels. Additional tone generating, decoding and control algorithms performed by the microprocessor under control of additional program control software can provide advanced squelch control functions, DTMF and other tone signalling functions, and the like.

It would be unfair (and also poor marketing strategy) to require users needing only a minimal transceiver configuration to pay for the high development cost of advanced features and enhancements. Accordingly, for various reasons it is still very much advantageous to offer the purchaser a "basic" lower cost transceiver configuration while permitting him to select additional features at higher cost—even though the main (and sometimes the only) difference between the basic and the enhanced transceivers may reside in the specific program control routines they execute. This marketing strategy allows the manufacturer to offer the basic unit at reduced cost and at the same time requires purchasers requiring enhanced operation to bear the additional costs associated with developing and providing the additional features. A still further benefit achieved by this strategy is that overall development, manufacturing and inventory costs are reduced substantially—since the same basic hardware configuration can be used for all models of the product.

For this marketing strategy to be successful, however, purchasers of low cost basic transceiver configurations must not be able to easily modify their units to obtain more expensive features. Otherwise, most purchasers would simply buy the "bottom-of-the-line" model and then modify it to obtain additional features (thereby defeating the marketing strategy and also unfairly obtaining the benefit of features for which they did not pay development or licensing costs).

One possible way to prevent purchasers from modifying transceiver units to obtain features they have not paid for is to provide different transceiver configurations, each configuration having essentially the same hardware but including a different PROM (programmable read only memory) storing only the subset of the program control instructions and transceiver parameter data associated with the specific configuration purchased. This approach has several disadvantages, however. Ultra-miniaturization provided by modern manufacturing and packaging techniques now make it possible to inexpensively "pack" hundreds or thousands of components into a very small physical volume (e.g., the interior volume of a hand-held digital radio transceiver). Such assemblies are often extremely difficult, however, to disassemble after they have been assembled at the factory—requiring the appropriate program store memory to be installed at time of manufacture. A large inventory of the various different versions of the program store memory must be maintained, and the final configuration of a particular transceiver must be determined at time of manufacture. It would be highly desirable to somehow defer that configuration determination until closer to time of purchase (so that, for example, distributors would only need to keep one basic unit in inventory).

Commonly assigned U.S. Pat. No. 4,525,865 to Mears discloses an arrangement whereby a non-volatile memory within a mobile radio transceiver can be reprogrammed without physical entry into the transceiver or removal of components to provide the radio with additional operational options (e.g., tone or digital addresses, carrier control timers, or the like). However, if such reprogramming were used to provide optional advanced features, there may be nothing (other than the copyright laws) preventing an intelligent purchaser from downloading upgrade information into his transceiver's internal non-volatile memory. Thus, the Mears solution is highly effective to permit customization of transceiver "personality information", but may have more limited utility in selecting the set of basic operational features to be provided by particular transceivers.

U.S. Pat. No. 4,392,135 to Ohyagi and U.S. Pat. No. 4,378,551 to Drapac listed above disclose security arrangements for enabling and/or inhibiting features in paging receivers.

Ohyagi teaches an "information setter circuit" comprising an 8×9 bit PROM in which is stored "option selection bits" for selecting various functional options of the paging receiver (e.g., automatic resetting after an alert, paging by mechanical vibration in lieu of tone, and a battery saving feature). The microprocessor reads the information stored in this circuit as an input to the program control algorithm it executes and enables or inhibits the various option features accordingly.

The Drapac patent discloses discrete logic security circuitry incorporated as part of the pager which connects with option selection circuitry contained in a separable "code plug." The code plug includes circuitry controlling tone decoding, and additional simple fusible link type circuitry which controls selection of various options such as battery saving, automatic reset, and dual call operation. Logic level signals are connected through the fusible links in the code plug to the security logic circuitry, and the logic circuitry in turn enables or disables the various options. The security logic circuitry detects when a user tampers with the code plug fusible link connections and prevents activation of the paging device whenever tampering occurs.

While such arrangements may be satisfactory in the context of a paging device, they do not readily lend themselves to the more complex environment of a full-featured digital radio transceiver—in which many more options may be provided and some additional circuitry and user controls may be required to implement the various options. In addition, greater security than Drapac's code plug can provide is necessary to prevent purchasers from successfully enabling transceiver advanced option features through tampering.

It is also known in certain prior art devices to disable functions by substantially irreversibly modifying circuitry. One example of such a technique is found cable television applications. Some early cable television decoders included multiposition channel selector switches with each channel position corresponding to a different television channel (some of which were categorized as "premium" channels). A subscriber could subscribe to all of the television channels or to only selected television channels (but of course, his monthly subscription fee would be increased if he subscribed to a greater number of "premium" channels). The "premium channels" were transmitted over the cable television network in "scrambled" form (e.g., with suppressed vertical sync signals or with some other essential signal component suppressed or altered) to prevent them from being properly received and displayed by a standard television receiver. The decoder units included a "descrambler" circuit (e.g., a filter/amplifier network for restoring vertical sync or other essential missing signal components) coupled to the multiposition switch.

All such decoder units were shipped from the factory in a standard configuration in which the multiposition switch disabled the descrambler circuit from operating on all channels. However, PC board pathways connected to different switch positions could be cut to prevent the descrambler circuit from being disabled (i.e., to enable the descrambler circuit) at certain switch (channel) positions (thus providing a capability to substantially irreversibly modify the decoder to selectively enable/disable descrambling functions on a channel-by-channel basis). The Cable Television Company could thus "program" a decoder to descramble only the specific premium channels subscribed to by a particular subscriber by opening the decoder unit to access its internal PC board and cutting selected individual PCB pathways coupled to corresponding channel selector switch positions. The decoder was typically housed in a secure sealed cabinet that was difficult or impossible to unseal without using special tools—effectively preventing the average consumer from accessing and severing additional pathways to enable descrambling of additional premium channels.

This technique has now generally been discarded by the cable television industry in favor of periodically digitally downloading channel enablement tables into a non-volatile memory within the decoder and using this channel enablement information to selectively enable/disable descrambling on a channel-by-channel basis. In any event, it is difficult to see how any of these prior art cable television techniques could provide practical solutions to the problem of selecting functions to be provided by digital radio communications transceivers.

It is also generally known to set hardware configurations by selecting continuity/discontinuity between processor-readable connections. For example, it is common for manufacturers of boards for personal computers to include so-called DIP (dual in-line package) switches or jumpers on their boards to allow the user to set parameters (e.g., bus address, interrupt, or the like) associated with the hardware. Such switches/jumpers may in some cases be used to provide information (e.g., "my address is" or "my hardware configuration is") to the processor communicating with the hardware (thus allowing the system to automatically "configure" itself under software control upon power up, for example). Of course, jumpers and DIP switches are designed such that it is easy to change the configurations they select. As a cost-saving measure, some manufacturers may in the past have eliminated the jumpers and/or DIP switches altogether and instead provided PC board pathways the user or installer must cut or scrape off to provide bus address information or the like. These arrangements are often troublesome, however (since a soldering iron is needed to change the configuration once it has been selected) and are therefore typically reserved for the cheapest of devices.

It is unclear how jumpers or DIP switches could be used to specify radio configuration on the hardware level at time of radio purchase while preventing users from later changing the specified configuration. Jumpers and DIP switches are typically relatively easy to set, and are therefore relatively easy to change. Moreover, such devices are normally mounted directly on a printed circuit board or the like—and would therefore require the radio to be disassembled for the jumpers or DIP switches to be set as desired. Thus, this "solution" is similar to the solution discussed above of providing different program store memories for different transceiver versions—and has many of the same disadvantages (e.g., requiring transceiver configuration to be specified at time of manufacture).

The copending patent application Ser. No. 07/183,212 of Ingham filed on Apr. 19, 1988 referred to above provides a highly suitable and successful solution to the problem of configuring a digital radio transceiver subsequent to time of manufacture. In that arrangement, a single "base" transceiver unit is manufactured, this transceiver base unit being common to all of several different transceiver configurations. Different transceiver front panel "escutcheon plates" carrying different control configurations are provided for the different transceiver configurations. These front panel escutcheon plates interconnect both mechanically and electrically to the transceiver base unit.

Thus, the escutcheon plates in the preferred embodiment disclosed in the Ingham application carry entire electrical switch assemblies—including electrical contacts and associated actuator "buttons". The escutcheon plate modules corresponding to all but the "basic" configuration also carry a "security circuit" which communicates with the transceiver microprocessor within the base unit at certain times (e.g., during transceiver "power up"). Different security circuits are provided for the different escutcheon plate configurations, each of the different security circuits permuting signals sent to them in a different way.

In the Ingham arrangement the transceiver sends serial data signals to the security circuit disposed on the escutcheon plate connected to it, and receives back a permuted version of those signals (if the escutcheon plate corresponds to some configuration other than the basic configuration). The microprocessor determines the configuration of the escutcheon plate module in response to which permuted version of the signals it receives back from the security circuit. Thus, the purchaser cannot obtain additional functionality by merely providing additional controls—he must also provide a security circuit corresponding to the new control configuration. Great security is provided against tampering with or defeating of the security circuit because the permutation function performed by the circuit is complex and emulation of this function would require sophisticated techniques and/or a physically large circuit.

While the Ingham arrangement is highly successful in its own right, further improvements are possible. In particular, the escutcheon plates used in the Ingham arrangement are somewhat expensive to manufacture, since they may carry entire electromechanical switch assemblies, electrical connectors, and (for units having "optional" features) an electronic security circuit. It would be highly desirable to provide interchangeable escutcheon plate assemblies comprising only a few mechanical parts. Such a purely mechanical escutcheon plate module design would eliminate the costly (and occasionally unreliable) electrical connectors used in the prior art to connect escutcheon plate modules to transceiver base units.

Unfortunately, the extremely difficult problem arises as to how to prevent a purchaser of the basic configuration version from simply installing different mechanical parts to provide additional features. The problem is that the same features making it possible for the manufacturer or distributor to quickly, easily and conveniently change transceiver configurations also make it possible for purchasers to alter the configurations of their own transceivers (and thus defeat the manufacturer's marketing strategies as well as obtaining "for free" the benefits of advanced transceiver functions and features the purchaser should in all fairness be reimbursing the manufacturer for developing).

The present invention provides a solution to this problem. Like the prior art "MLS" series radio transceivers and the arrangement described in the commonly-assigned Ingham application, the present invention provides different transceiver front panel escutcheon plate assemblies for different transceiver feature configurations. Unlike past arrangements, however, the present invention does not require any electrical components to be provided within differently configured interchangeable escutcheon plate assemblies.

In accordance with one aspect of the present invention, the same basic transceiver unit is used for several different transceiver feature configurations. This basic transceiver unit typically may provide all of the (software controlled) features and functions of the "top of the line" transceiver feature configuration (and thus provides a superset of the features and functions provided by the other transceiver "models"). This basic transceiver also provides a mechanism for substantially irreversibly selecting a subset of the total features provided by the basic transceiver unit—this selection mechanism preferably being operable from outside of the transceiver case. Once made, the selection is preferably difficult or impossible to reverse—preventing a purchaser from defeating the selection in an attempt to enable additional transceiver functions.

In the preferred embodiment, for example, there are holes cut through the transceiver front panel in registry with associated underlying printed circuit board pathways. To irreversibly disable certain transceiver functions, it is necessary only to sever the pathways. Severing the pathways does not destroy hardware functionality in the preferred embodiment, but instead disables performance of certain portions of the transceiver microprocessor software programming implementing advanced or "optional" features.

As mentioned above, the feature selection mechanism provided by the present invention is preferably substantially irreversible. For example, a purchaser trying to form solder or other similar conductive bridges over the severed printed circuit board pathways in order to defeat the feature selection (and thus "upgrade" his transceiver to provide additional features without paying the additional associated purchase price to compensate the manufacturer for the development costs associated with those additional features) would probably find it necessary to disassemble and reassemble the transceiver (in all likelihood damaging certain components in the process).

These and other features and advantages of the present invention will be better and more completely understood by referring to the following detailed description of presently preferred exemplary embodiments in conjunction with the appended sheets of drawings, of which:

DETAILED DESCRIPTION OF THE PRESENTLY PREFERRED EXEMPLARY EMBODIMENTS

Figure 1:
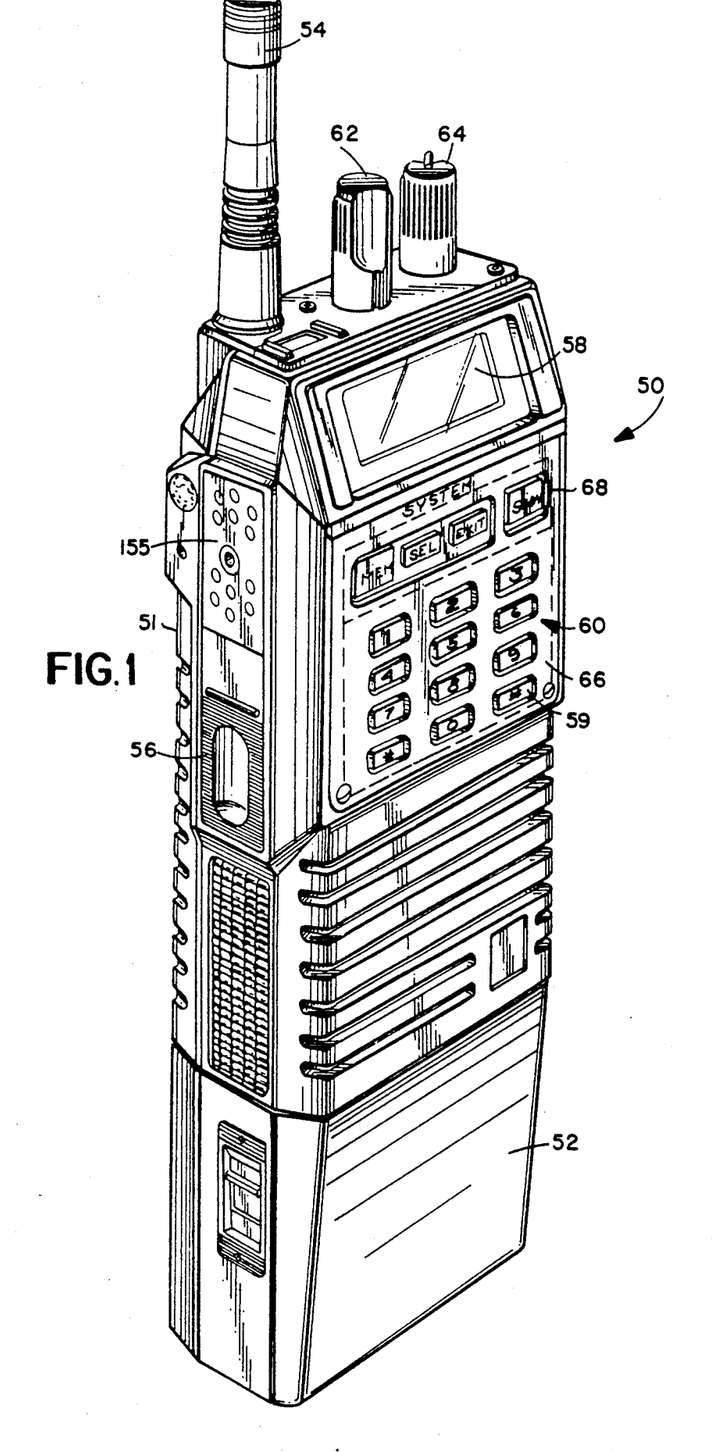
FIG. 1 is an elevated side view in perspective of a presently preferred exemplary embodiment of a digital radio transceiver in accordance with the present invention including an escutcheon plate assembly having a full-featured "SYSTEM" control configuration.

FIG. 1 is a side perspective view of a presently preferred exemplary embodiment of a digital radio transceiver 50 in accordance with the present inVention. Transceiver 50 includes a main module 51 and battery operated power supply module 52. In the preferred embodiment, transceiver 50 is the same transceiver as is disclosed in in copending commonly-assigned U.S. patent application Ser. No. 07/390,254 of Hodsdon filed concurrently herewith (the entire disclosure of which is hereby incorporated herein by reference).

Briefly, transceiver 50 includes conventional microprocessor based digital and digitally controlled circuitry for generating modulated RF signals for radiation by antenna 54 and for receiving and demodulating RF signals received by the antenna. A conventional frequency synthesizer circuit internal to transceiver 50 determines the RF transmit and receive frequencies under control of digital signals produced by an internal microprocessor. A Push-To-Talk (PTT) switch 56 controls the transmit/receive mode of transceiver 50, and an LCD type display 58 displays channel, status and other information. In the transceiver configuration shown in FIG. 1, the user may further control the functions of transceiver by depressing one or more keys 59 provided on a front panel escutcheon plate assembly 60. On/Off control and volume control is performed by a knob 62, while a further knob 64 can be operated to control channel selection by the microprocessor.

In the preferred embodiment, transceiver 50 is provided in several different configurations, including:

(a) the "System" configuration (which provides channel scanning capabilities under control of a four-key keypad 68 and DTMF tone generation under control of an additional 12-key telephone type keypad 66);

(b) the "Scan" configuration (which provides channel scanning capabilities but does not provide DTMF tone generation or the twelve-key telephone type keypad 66); and (c) the "Select" configuration (which provides no channel scanning, no DTMF tone generation, and relies solely on knob 64 for operating channel selection).

The transceiver 50 shown in FIG. 1 has the "System" configuration. Keypad assembly 60 for this configuration includes a twelve-key keypad subarray 66 for controlling generation of DTMF tone (i.e., TOUCH-TONE) telephone type dialing signals, and a further four-key keypad subarray 68 for controlling scanning functions. This four-key subarray 68 in the preferred embodiment provides keys labelled "MENU", "SELECT", "EXIT" and "SCAN" to respectively call up scan selection display menu options on LCD display 58, select entries from the menu, exit the menu display mode, and initiate channel scanning.

Figures 2, 3, 4:
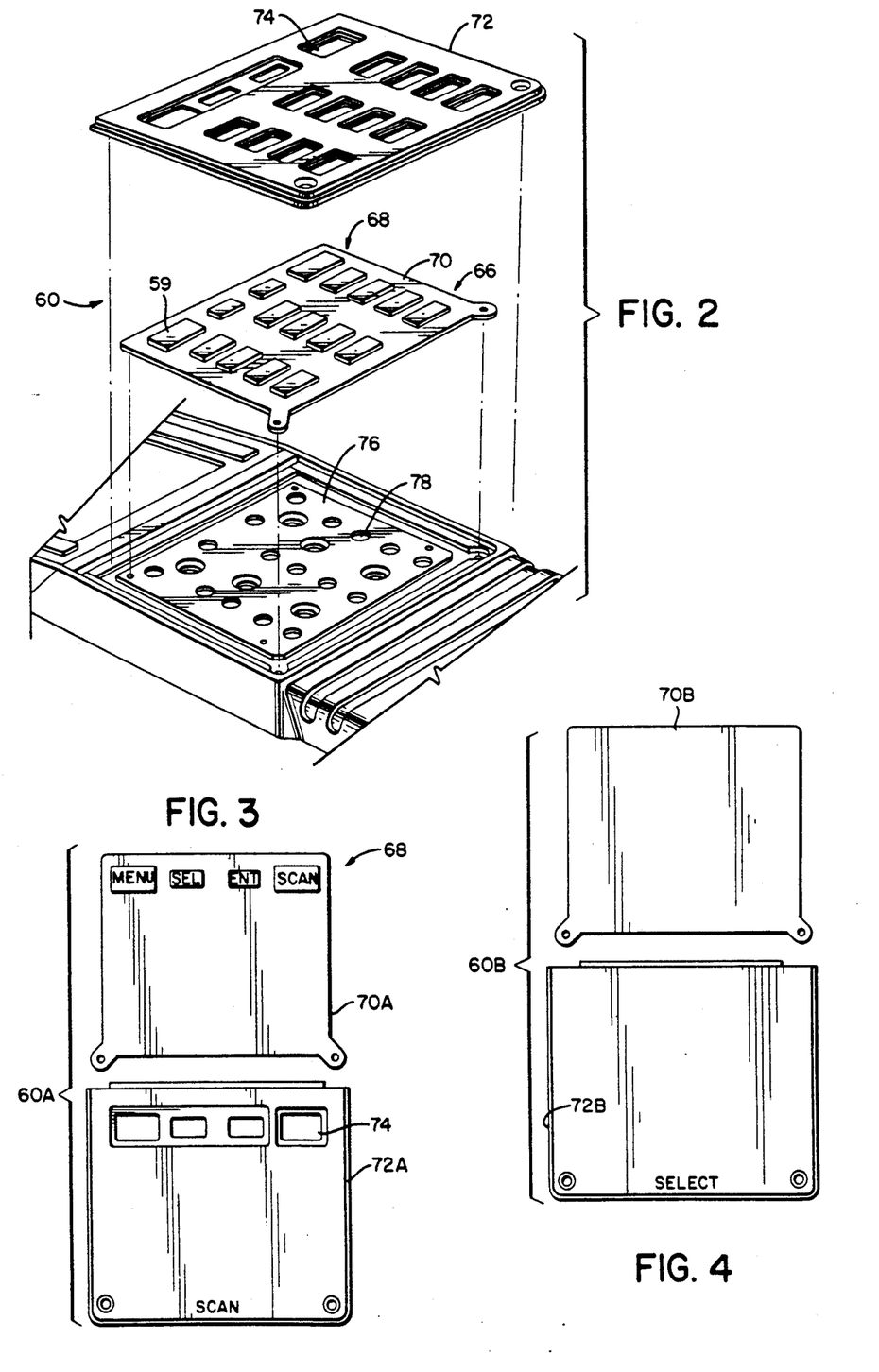
FIG. 2 is an exploded side perspective view of the escutcheon plate assembly shown in FIG. 1 showing how the assembly is mounted to the transceiver front panel.
FIGS. 3 and 4 are elevated front views in plan of escutcheonplate assemblies interchangeable with the escutcheon plate assembly shown in FIG. 1.

FIG. 2 shows an exploded side perspective view of keypad array 60 and associated assembly shown in FIG. 1. As shown in FIG. 2, the preferred embodiment escutcheon plate assembly 60 includes a flexible keypad 70 defining key subarrays 66, 68, and further includes a rigid plastic mounting bezel 72 providing openings 74 in registry with the various keys of subarrays 66, 68. As described in much greater detail in the copending Hodsdon patent application, keypad 70 and associated bezel 72 mount onto the transceiver front panel 76 through a combination of interlocking parts and fasteners. Front panel 76 includes a plurality of openings 78 providing access by the subarray keys 59 to corresponding electrical switch contact sets disposed beneath the transceiver front panel.

Figure 6:
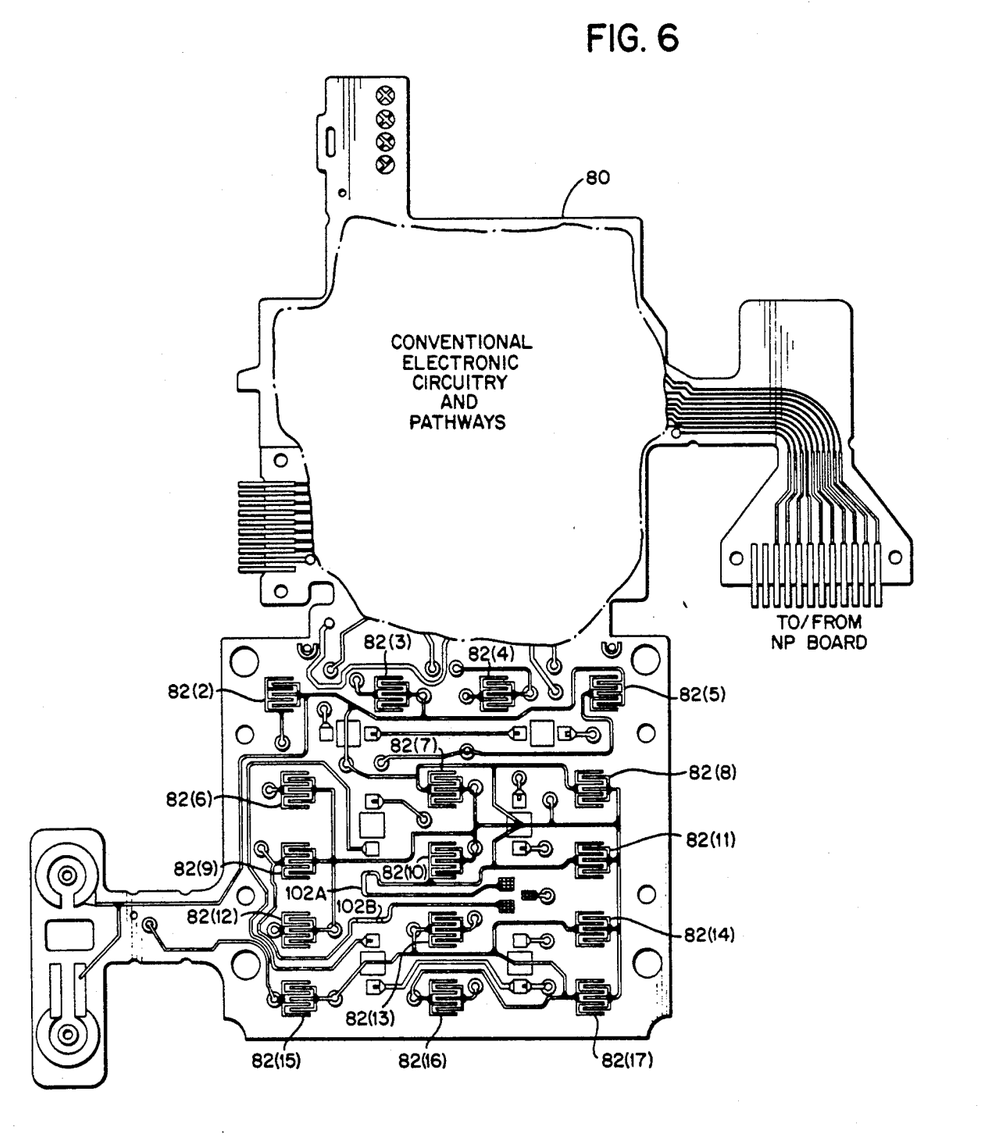
FIG. 6 is a top plan view of an exemplary flexible printed wiring board (PWB) disposed within the FIG. 1 transceiver beneath the front panel exposed in the FIG. 5 view.

FIG. 6 is a top view in plan of an exemplary flexible printed wiring board (PWB) 80 mounted beneath front panel 76. PWB 80 defines a plurality of electrical contact sets 82, each contact set including conventional opposing interdigitated non-contacting electrical pathways 83. In the preferred embodiment, there are sixteen contact sets 82(2)–82(17): twelve contact sets 82(6)–82(17) corresponding to the twelve keys 59 within subarray 66, and another four contact sets 82(2)–82(5) corresponding to the four keys in subarray 68. Each key 59 defined by keypad 70 includes a cylindrical member (not shown) terminating in an electrically conductive pad. These members descend through front panel holes 78 and are in registry with contact sets 82. When a key is depressed, its associated conductive pad moves downward into direct contact with the interdigitated pathways 83 of associated contact set 82 to establish electrical contact between those interdigitated pathways—thus "closing" the electrical switch formed by the combination of the contact set and the key conductive pad.

The different transceiver feature configurations require different keypad control configurations (since configurations with fewer features generally use fewer keys). As described in that copending Hodsdon application, different keypads 70 are provided to access different subsets of the electrical contact sets 82 disposed on PWB 80. For example, the flexible keypad 70 and associated front bezel 72 shown in FIG. 2 has a full set of twenty keys 59 to access and permit the user to actuate all/any of the underlying electrical switch contact sets 82. However, the flexible keypads and associated bezels for other configurations of transceiver 50 have only partial sets of keys 59 and permit the user to actuate only some of the underlying contact sets 82—with different keypads accessing different subsets of underlying switch contact sets. Thus, different control configurations and associated transceiver function configurations can be provided by installing appropriate associated mechanical portions (e.g., the rubberized keypad 70 and associated bezel 72) onto the transceiver front panel 76.

FIG. 3, for example, is a side view in plan of a further escutcheon plate assembly 60A corresponding to the transceiver 50 "SCAN" configuration. This "SCAN" configuration escutcheon plate assembly 60A comprises a keypad 70A providing only key subarray 68 (and not key subarray 66), and a corresponding bezel plate 72A which includes only openings 74 in registry with keys 59 of subarray 66. Escutcheon plate assembly 60A shown in FIG. 3 is fully interchangeable with the assembly 60 shown in FIG. 2. When assembly 60A is installed on transceiver front panel 76, electrical contact sets 82(6)–82(17) disposed on PWB 80 are disabled from operating (since there are no corresponding keys 59 and associated conductive members to descend through front panel holes 78 and make contact between the corresponding contact set interdigitated pathways 83). Thus, installing escutcheon plate assembly 60A in lieu of assembly 60 effectively prevents the user from accessing DTMF tone generation functions provided by transceiver 50 (as those tone generation functions respond only to electrical closure of contact sets 82(6)–82(17).

FIG. 4 is a front view in plan of a further escutcheon plate assembly 60B corresponding to the transceiver 50 "SELECT" configuration. This "SELECT" configuration provides neither channel scanning features nor DTMF tone generation features—and thus there is no need for either of key subarrays 66, 68. Accordingly, keypad 70B defines no keys and is provided merely to weatherproof transceiver front panel 76. Similarly, bezel 72B defines no openings 74 and comprises a "blank" front plate. When transceiver 50 is configured with escutcheon plate assembly 60B corresponding to the "SELECT" feature configuration, none of the underlying electrical contact sets 82 are accessible by the user (since there are no keys defined in keypad 70B to provide contact closure).

Thus, keypads 70, 70A and 70B (in association with bezels 72, 72A, 72B, respectively) select a subset of the electrical contact sets 82 disposed on PWB 80 for operation by a user and effectively prevent the user from operating any contact sets not within the selected subset. For the exemplary escutcheon plate assembly configurations described, assembly 60 selects all sixteen electrical contact sets 82 for operation by the user; assembly 60A selects only a row of four electrical contact sets 82(2)-82(5) for operation (and prevents the user from operating any of the other twelve contact sets 82(6)-82(17)); and assembly 60B selects no electrical contact sets 82 for user operation (thus preventing the user from operating any of the functions performed in response to electrical closure of those contact sets).

Of course, it is highly desirable that escutcheon plate assemblies 60, 60A, 60B be completely interchangeable and very easy to install and replace (thus, for example, permitting the manufacturer or distributer of transceiver 50 to select the transceiver configuration at or near the time the transceiver is provided to the customer). Unfortunately, these desirable features also create the potential that a purchaser could himself "upgrade" his transceiver configuration (and thereby avoid possibly higher costs for purchasing transceivers with additional functionality). For example, a purchaser could purchase a transceiver 50 configured as a "SELECT" unit with no keypad keys and a blank plate 72B, remove the escutcheon plate assembly 60B from the transceiver front panel, and install an escutcheon plate assembly 60A or 60 to upgrade the transceiver functionality to that of a "SCAN" or "SYSTEM" configured transceiver.

An important aspect of the present invention is to prevent a purchaser from "upgrading" his transceiver configuration by merely substituting one escutcheon plate assembly 60 for another.

Figure 5:
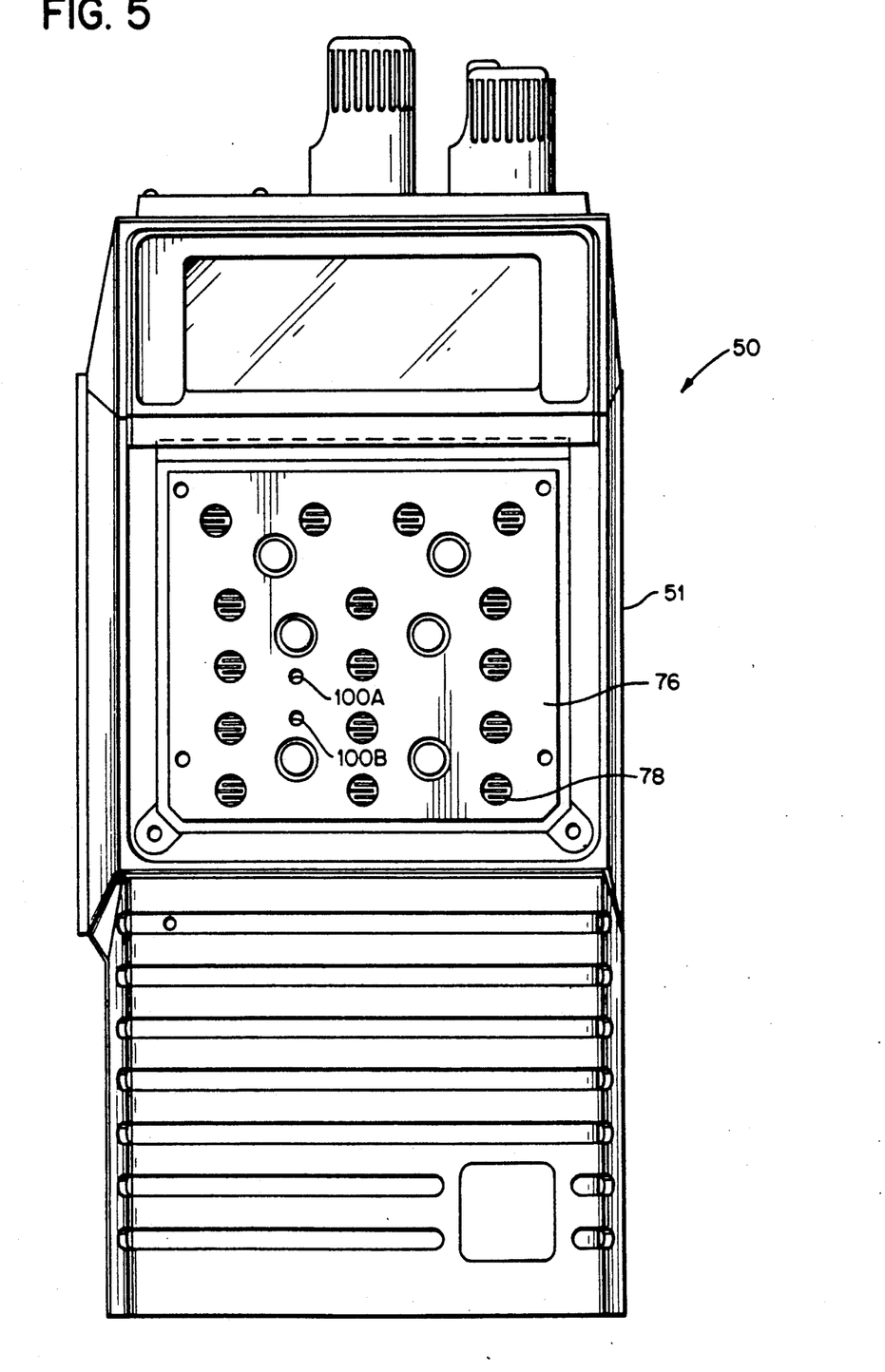
FIG. 5 is a front plan view of the transceiver shown in FIG. 1 with the escutcheon plate assembly removed to expose the transceiver case front panel.

In accordance with an important feature of the present invention, transceiver main unit 51 is provided with a means for substantially non-reversibly disabling certain transceiver functions. Referring more particularly to FIG. 5, transceiver front panel 76 defines (in addition to the openings 78 permitting access by keypad 70 to the electrical contact sets 82 disposed on underlying PWB 80) two additional smaller openings 100A, 100B. These additional openings 100A, 100B are in registry respectively with underlying PWB pathways 102A, 102B disposed on PWB 80 (see FIG. 6). Openings 100A, 100B are just large enough in the preferred embodiment to permit a small sharp tool to descend to the level of PWB 80 and remove (i.e., scrape off) a cross-section of pathways 102A, 102B. As will be explained shortly, the digital microprocessor internal to transceiver 50 is capable of detecting independently whether pathways 102A, 102B are continuous, and disables certain functions if it detects that one or both pathways have been severed.

Once either of pathways 102A, 102B have been cut, it is extremely difficult to make the pathways continuous once again. Openings 100A, 100B are too small to accommodate the tip of a soldering iron or other connection-forming tool, and in the preferred embodiment PWB 80 is mounted nearly flush with the inner surface defined by front panel 76 (so that a connection forming tool descending through another, larger hole cannot access pathways 102A, 102B). Transceiver front panel 76 is preferably composed of an electrically conductive material maintained at ground potential (for RF shielding effects). Therefore, solder beads or other conductive material inserted into holes 100A, 100B in an attempt to re-establish electrical continuity over pathways 102A, 102B would in all likelihood merely serve to short the pathways to the front panel and thus to ground potential. As will be explained, shorting the pathways 102A, 102B to ground potential would not cause transceiver 50 to re-enable the disabled transceiver functions (and in fact would actually disable the certain contact sets 82 from functioning).

Perhaps the only practical and effective way to reestablish continuity over pathways 102A, 102B once those pathways have been cut is to almost entirely disassemble transceiver 50 to access PWB 80, remove PWB 80 from the transceiver, provide solder or other conductive material to bridge the cut portions of pathways 102A, 102B, and to then reassemble the transceiver. While a skillful electronics technician could no doubt perform this complex and time-consuming operation, it is beyond the capabilities of the average purchaser and therefore the cutting of pathways 102A, 102B is substantially, effectively and practically irreversible.

Figure 7:
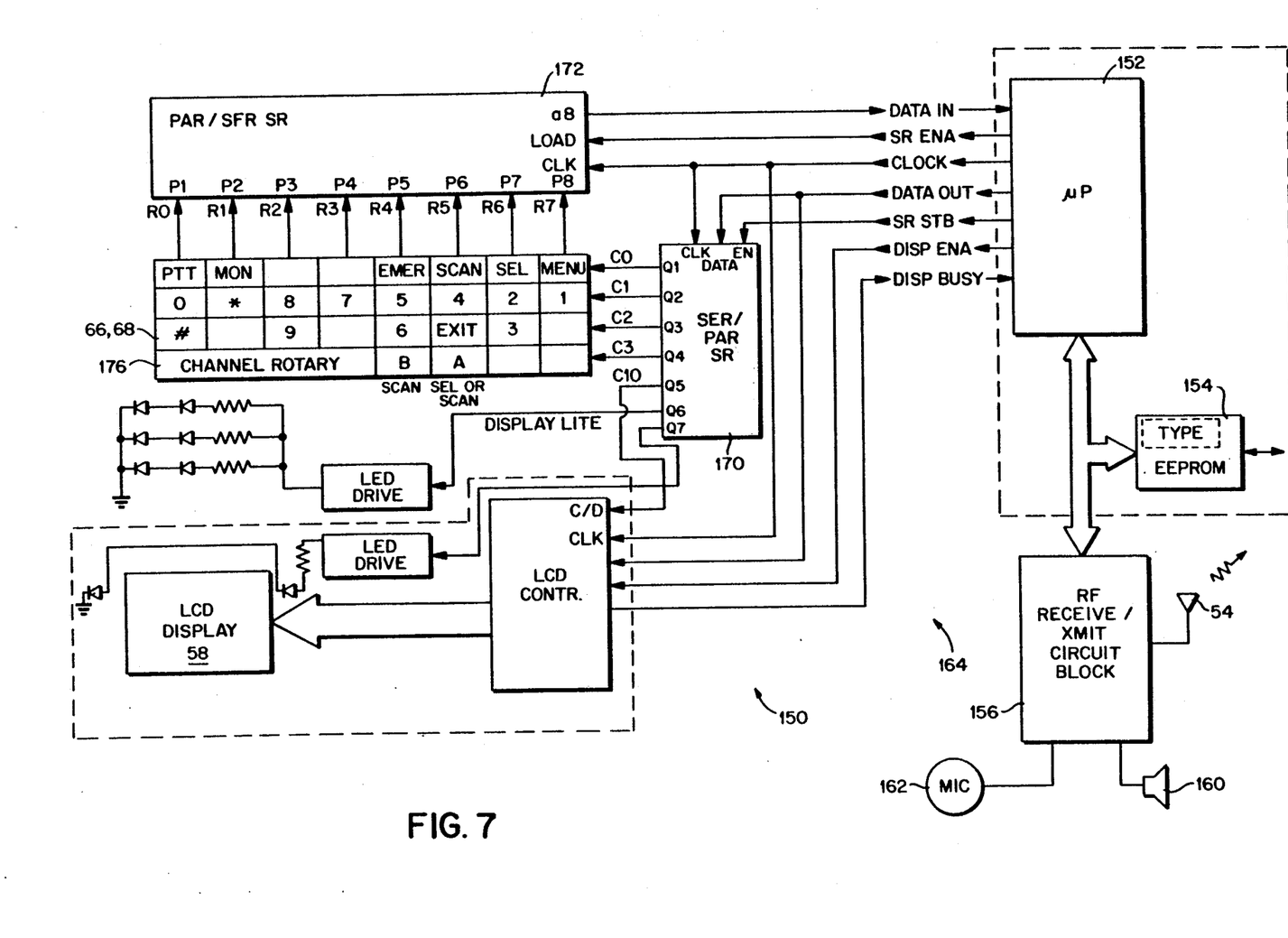
FIG. 7 is a schematic block diagram of an exemplary microprocessor-based circuit within the FIG. 1 transceiver.

FIG. 7 is a schematic block diagram of exemplary transceiver circuitry 150—some of which is included on PWB 80. Transceiver 50 includes a microprocessor 152 (preferably including an internal read only memory type program store not shown), a "personality defining" non-volatile memory device 154, an RF circuitry block 156 coupled to RF antenna 54, a loudspeaker 160, a microphone 162, and a user control interface circuit 164. In the preferred embodiment, user control interface circuit 164 is disposed (at least for the most part) on PWB 80 along with pathways 102A, 102B.

Microprocessor 152 controls the operation of RF circuitry 156 in a conventional manner by applying digital signals to and receiving digital signals from the RF circuitry. RF circuitry 156 (which in the preferred embodiment includes a conventional digitally controlled frequency synthesizer) receives and demodulates RF signals, and generates, modulates and transmits RF signals—all at RF frequencies specified by microprocessor 152 under program control (e.g., at operating frequencies determined by data stored in PROM 154).

User control interface circuit 164 in the preferred embodiment provides a matrix type keypad scanner arrangement. This scanning arrangement includes a shift register 170 for generating scanning signals and applying the scanning signals to switch contact sets 82; and a further shift register 172 for reading switch states from the switch contact sets and providing an indication of those states to microprocessor 152. In the preferred embodiment, contact sets 82 are arranged in a so-called "matrix" 176 of eight rows (R0-R7) and four columns (C0-C3). Microprocessor 152 typically performs keyboard scanning by writing data to the serial input of shift register 170 and then reading data from shift register 172.

In the preferred embodiment, shift register 170 is a serial-to-parallel converter with an output latch thus, register 170 receives data serially, converts the data into parallel form, and latches the parallel data to generate outputs upon receipt of a signal "SR STB" from microprocessor 152. Microprocessor 152 can thus control shift register 170 successively propagate an active low signal level to its outputs C0 (Q1), C1 (Q2), C2 (Q3), and C3 (Q4) by writing the following four bytes in sequence to the shift register:

0111xxxx
    1011xxxx
    1101xxxx
    1110xxxx (where "x" is a "don't care" with respect to the control scanning algorithm). This sequence of bytes results in signals (∅, C1, C2 and C3 being generated in sequence with no two of the signals being generated simultaneously.

Upon column signal C0 becoming active low, shift register 172 performs a parallel load of eight bits (one byte) corresponding to the switch states for nominally eight (but only six in the preferred embodiment) different switch contact sets 82 and transfers the resulting byte to microprocessor 152 via the microprocessor DATA IN line. When signal C1 becomes active low, shift register parallel-loads another eight bits corresponding to the switch states of eight more switch contact sets and the resulting byte is transferred serially to microprocessor 152. This process is repeated to cause column signals C2 and C3 to successively become active low—providing two more serial bytes to microprocessor 152, each of these bytes indicating a maximum of eight switch states.

The resulting 32-bit bit map of switch states is used by the microprocessor to determine which, if any, of keys 59 have been depressed by the user (and also to indicate the state of channel knob 64 and the states of some additional transceiver controls such as PTT switch 56, an "emergency" (EMER) switch, etc.). The following is an exemplary table of the significance of the various bits in the bit map by row (R0-R7 correspond to the eight parallel inputs of shift register 172) and column (as mentioned above, C0-C3 correspond to successively generated outputs of shift register 170).

Figure 8A:
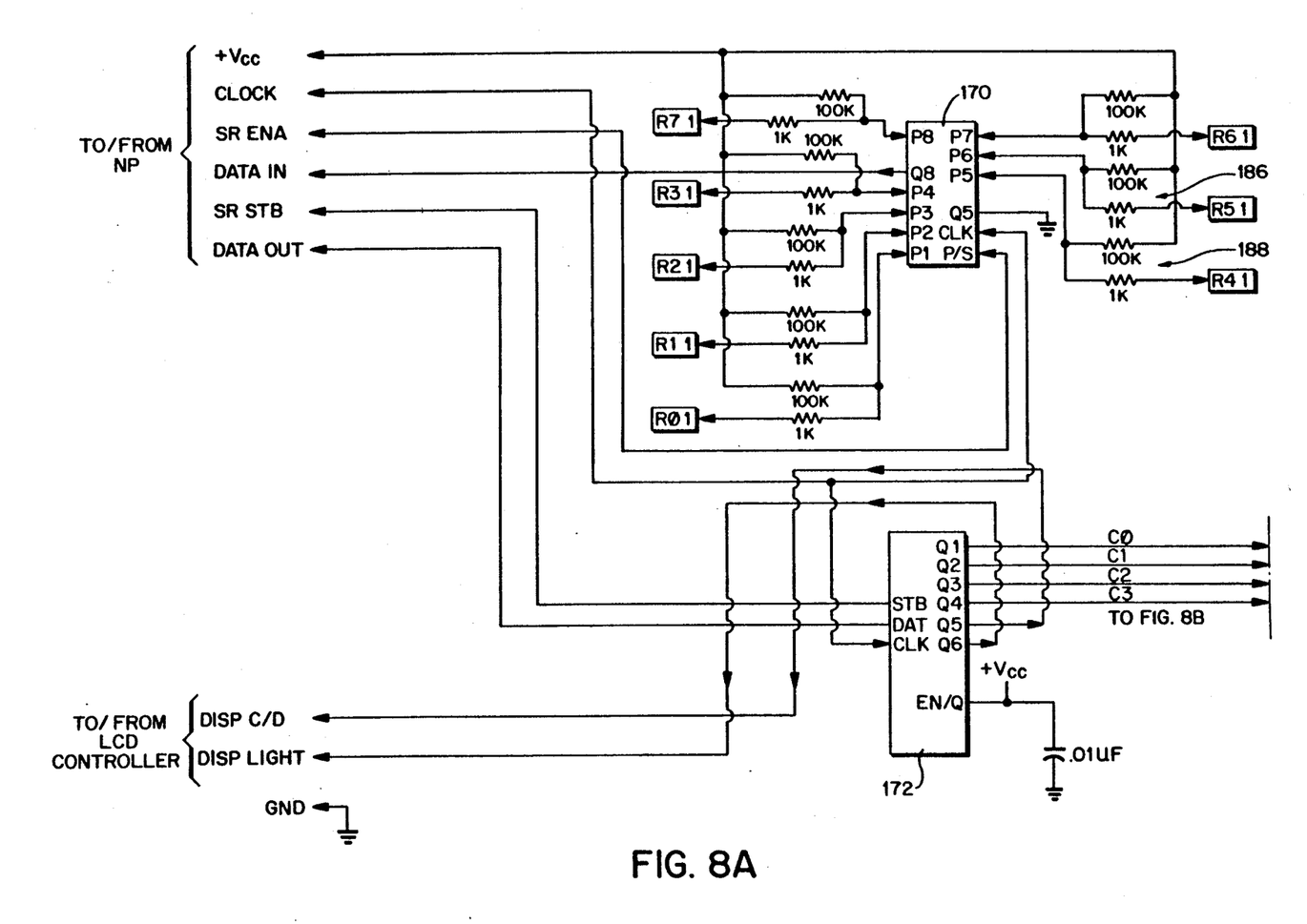
FIGS. 8A and 8B are detailed schematic diagrams of an exemplary keypad scanning circuit portion of the circuit shown in FIG. 7.
Figure 8B:
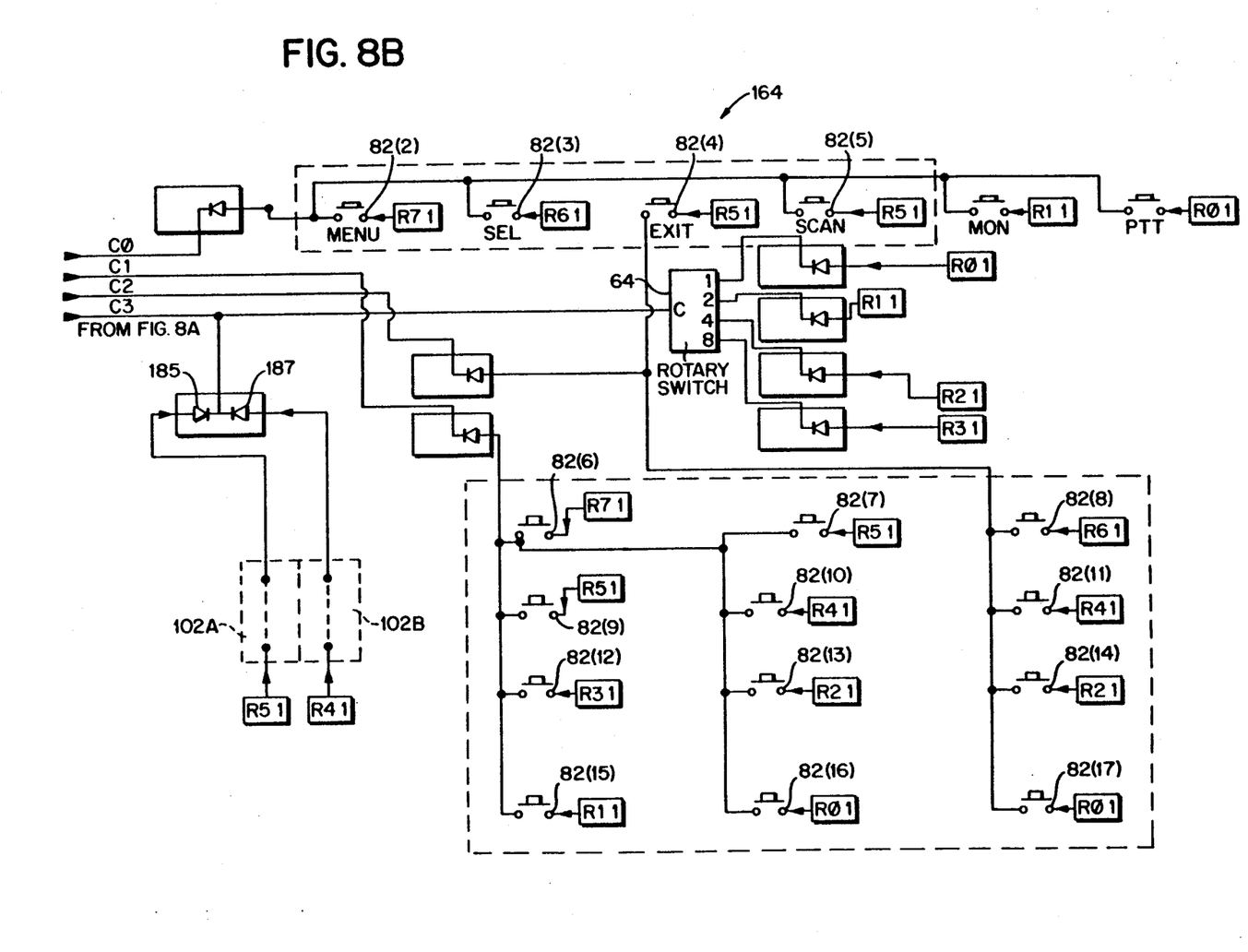

Assume pathways 102 are both uncut. When C3 drops to logic level zero (active low), the level of shift register 170 input P6 is "pulled down" via resistor network 186, pathway 102A, diode 185 and active low shift register 172 output C3. Electrical continuity to ground is similarly provided between shift register input P6 and shift register 172 output C3. Both of resistor networks 186, 188 are thus "pulled down" to ground potential, providing logic level 0 levels at shift register 170 inputs P6, P5—and resulting logic level 0 bit values provided to microprocessor 152 in the switch scanning bit-map indicate that both pathways 102 are continuous.

Suppose now that pathway 102A is cut. No continuity is provided through pathway 102A to the active low C3 output of shift register 172, and associated resistor network 186 is accordingly not "pulled down" to logic level zero but instead remains at logic level one. The entry in the switch scanning bit-map corresponding to pathway 102A accordingly will be a logic level 1 rather than a logic level 0—indicating to microprocessor 152 that pathway 102A has been cut. Cutting of pathway 102B similarly changes its corresponding bit-map entry from logic level 0 to logic level 1.

The resulting two-bit field in the bit-map provided to microprocessor 152 takes on one of four states (no pathways cut; only pathway 102A cut; only pathway 102B cut; both pathways cut) depending upon how the transceiver 50 has been irreversibly modified by cutting (or

TABLE I

| SRin | R7 | R6 | R5 | R4 | R3 | R2 | R1 | R0 |
|------|------|------|------|------|------|------|------|------|
| C0 | 82(2) | 82(3) | 82(5) | EMER | | | MON | PTT |
| C1 | 82(6) | 82(7) | 82(9) | 82(10) | 82(12) | 82(13) | | 82(16) |
| C2 | | 82(8) | 82(4) | 82(11) | | 82(14) | | |
| C3 | | | 102(B) | 102(A) | ROTARY CHANNEL SWITCH | | | |

The table set forth above includes entries corresponding to the state of each of the various electrical contact sets 82. However, the table also includes entries corresponding to pathways 102A, 102B. In the preferred embodiment, the "states" (continuous or discontinuous) of pathways 102 are scanned at the same time transceiver 50 scans the state of rotary switch 64, and microprocessor 152 reads the states of pathways 102 in essentially the same manner as if the pathways comprised additional electromechanical switches. Microprocessor 152 thus receives the resulting state indications corresponding to pathways 102 within the same bit-map indicating the states of keys 59 and other controls of transceiver 50.

Referring for a moment to the detailed schematic diagram of FIG. 8, pathways 102A, 102B are schematically shown at the bottom center of the drawing as so-called "jumpers" (even though they do not have in fact have the structure normally associated with a conventional "jumper" but instead comprise conventional conductive metal pathways permanently bonded to PWB 80). The C3 (Q4) output of shift register 172 is connected to the cathode of a diode 185 the anode of which is connected to one end of pathway 102A. The other end of pathway 102A is connected to shift register 170 parallel load input P6 via a pull-up resistor network 186. Similarly, the C3 shift register output is connected to the cathode of a diode 187 the anode of which is connected to one end of pathway 102B. The other end of pathway 102B is connected to shift register 170 parallel load input P5 via another pull-up resistor network 188.

not cutting) pathways 102. Note that cutting of pathways 102 in the preferred embodiment does not disable any hardware functionality. That is, pathways 102 in the preferred embodiment don't perform any function whatsoever in the transceiver 50 other than to indicate how (if) the transceiver has been irreversibly modified. Scanning of the states of keys 59 in sub-arrays 66, 68 is performed in exactly the same way regardless of whether or not pathways 102 have been cut, and cutting of the pathways does not directly disable any hardware from operating.

However, tampering resulting in permanent shorting of either of pathways 102A,102B to ground potential (e.g., by inserting a solder bead between the pathways and transceiver front panel 76) would permanently "pull down" associated resistor networks 186,188—thus disabling scanning of all other keys 59 connected to those same rows.

As mentioned previously, in the preferred embodiment a "personality EEPROM" non-volatile memory 154 coupled to microprocessor 152 stores information specifying various purchaser-specific operating parameters (e.g., operating frequencies, radio identification, identification of other groups/individuals the transceiver is authorized to call, etc.). The personality-defining information stored in personality EEPROM 154 may thus be specific to the configuration (SYSTEM, SCAN, or SELECT) of the transceiver. This information may be stored into transceiver 50 from a personal computer type programming device or the like in a conventional manner via an external programming connector 155 at time of purchase of the transceiver. In the preferred embodiment, the programmer loads into memory 154 a "radio type ID" byte specifying the configuration of the transceiver (e.g., SYSTEM, SCAN or SELECT). This radio type ID has a value directly corresponding to the escutcheon plate arrangement 60 installed on the radio. In addition, just before the appropriate escutcheon plate assembly 60 is installed on transceiver 50, the seller may cut one or both pathways 102A, 102B to further indicate transceiver type.

For example, suppose a customer has ordered a SELECT type transceiver. The distributor downloads the appropriate customer-specific parameters corresponding to the customer's trunked radio system into the transceiver personality EEPROM 154—this downloaded information including a "TYPE" byte specifying the transceiver is a SELECT type radio (and not a SYSTEM or SCAN type radio). In the presently preferred embodiment, the distributor also cuts pathway 102A and leaves pathway 102B intact (thus also indicating the transceiver is a SELECT type radio) and installs escutcheon plate arrangement 60B onto the transceiver front panel 76. Hence, the cut/uncut configuration of pathways 102A, 102B; the TYPE byte stored in personality EEPROM 154; and the escutcheon plate arrangement 60B all correspond. The direct correspondence between the cut/uncut configuration of pathways 102A, 102B and the particular escutcheon plate arrangement 60, 60A, 60B installed on the transceiver front panel 76 is used by transceiver 50 to prevent a user from gaining additional functionality by installing a non-corresponding escutcheon plate arrangement (as will now be explained).

Figure 9:
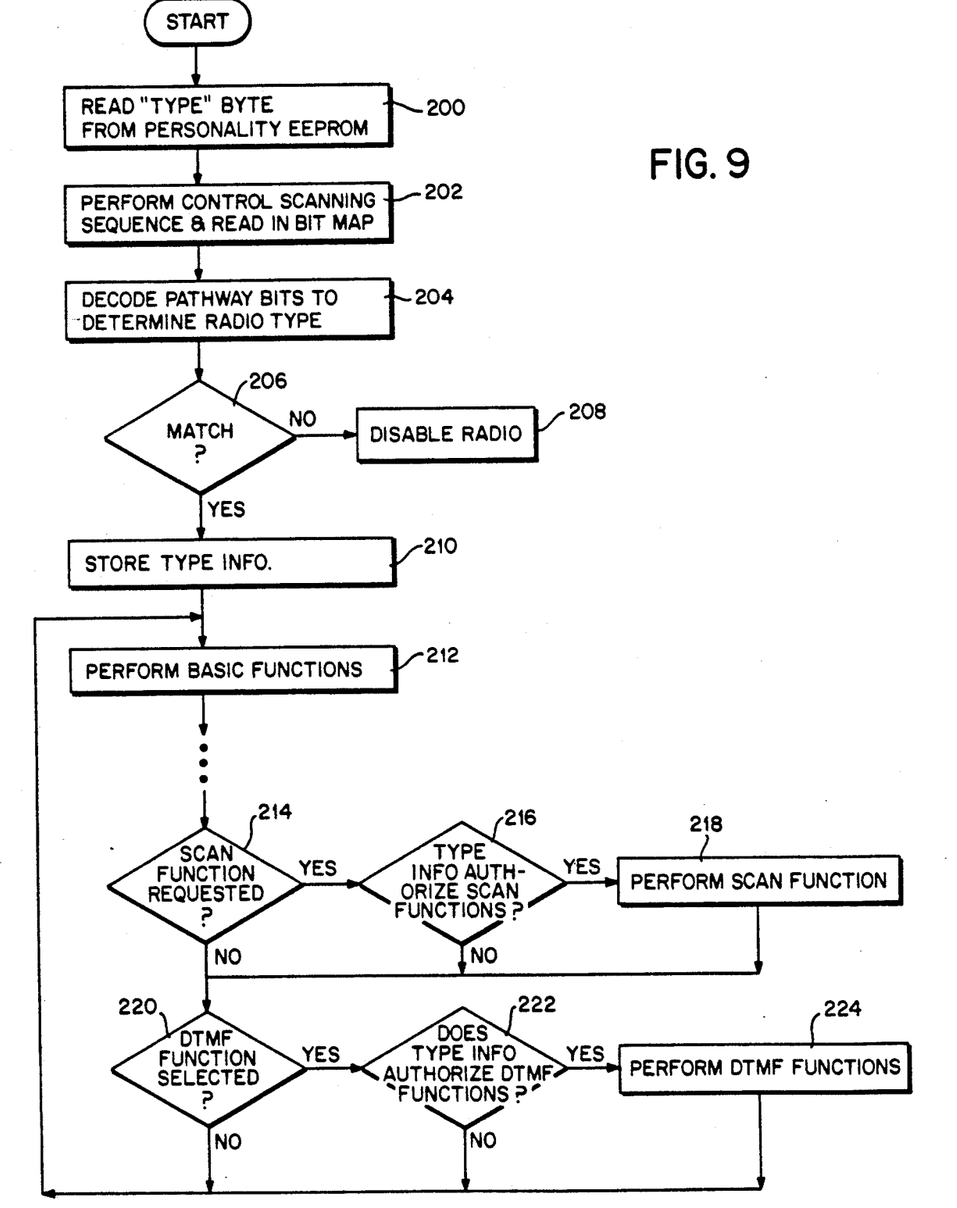
FIG. 9 is a flowchart of exemplary program control steps performed by the transceiver digital microprocessor shown in FIG. 7.

In the preferred embodiment, pathways 102A, 102B cause microprocessor 152 to inhibit/disable software-controlled functionality. FIG. 9 is a schematic flowchart of exemplary program control steps performed by microprocessor 152. This flowchart depicts two different, independent exemplary algorithms by which pathways 102A, 102B may be used to disable transceiver functionality. Referring now to FIG. 9, upon transceiver 50 power up (and possibly also periodically during transceiver operation) the transceiver reads the TYPE byte stored in memory 154 (block 200) and then performs a conventional keypad scanning routine to read in (via shift registers 170,172) the key depression bit-map described previously (block 202; note that this keyboard scanning routine is performed periodically during operation of transceiver 50 to detect switch depression by the user).

In the preferred embodiment, microprocessor 152 then decodes the two bits corresponding to pathways 102A, 102B in the resulting bit-map to determine the radio TYPE specified by the pathways (block 204). A suitable exemplary bit assignment for the bit-map bits corresponding to pathways 102A, 102B is as follows:

| 102A | 102B | RADIO TYPE | ESCUTCH. TYPE |
|---|---|---|---|
| 0 | 0 | SYSTEM | 60 |
| 0 | 1 | SCAN | 60A |
| 1 | 1 | SELECT | 60B |
| 1 | 0 | Not Used | |

If the radio TYPE information provided by decoding the bit-map bits corresponding to the cut/uncut state of pathways 102A,102B (block 204) does not match the radio TYPE information obtained from the personality EEPROM 154 (decision block 208), all further operation of the transceiver 50 may be disabled (block 208) (or alternatively, the radio TYPE byte stored in personality EEPROM 154 may be ignored and the transceiver may instead operate as the configuration indicated by pathways 102, as will now be explained).

In addition to (or in lieu of) blocks 200 and 206-208, transceiver microprocessor 152 may store the TYPE information obtained by block 204 from decoding the pathway bits (block 210) and use this information to inhibit or authorize execution of specific software functions associated with the different transceiver configurations. For example, since all transceivers 152 perform a certain subset of basic functions, those functions are performed without first determining the state of pathways 102 (block 212). However, certain channel scanning functions are only performed by SCAN or SYSTEM type transceivers 50 equipped with an escutcheon plate arrangement 60 or 60A.

If such a scan function is invoked (as tested for by decision block 214), microprocessor 152 determines (based on new, recent or past results of control scanning routine block 202) whether pathways 102A, 102B have appropriate states authorizing scanning functions to be performed (block 216). In the preferred embodiment, for example, decision block 216 checks the bits corresponding to pathways 102 in the bit-map to determine whether the transceiver type is SCAN or SYSTEM. If pathways 102 indicate that the transceiver type is SELECT, microprocessor 152 does not perform the scan functions ("N" exit of decision block 216). If, on the other hand, pathways 102 indicate the transceiver type is SCAN or SYSTEM, microprocessor 152 performs the requested scanning function (block 218). Likewise, decision block 222 inhibits microprocessor 152 from performing DTMF generation (and other full feature keypad functions) unless pathways 102A, 102B are both uncut and thus indicate transceiver type as SYSTEM.

An arrangement has been described which allows radio transceivers to be flexibly, easily configured subsequent to time of manufacture by providing only interchangeable, inexpensive mechanical components. This arrangement prevents a purchaser from later reconfiguring his transceiver to obtain additional functionality. The arrangement offers huge cost savings (in terms of inventory and manufacturing costs), greater flexibility (by permitting a radio transceiver to be configured "at the last minute" such as just prior to sale, rather than requiring it to be configured at time of manufacture), and yet prevents purchasers from frustrating marketing considerations (and unfairly obtaining features they have not helped to pay for the development of) by providing a mechanism for non-reversibly modifying the transceiver from outside of the assembled transceiver. This non-reversible modification preferably does not disable or destroy hardware functionality in the preferred embodiment but rather inhibits certain software-controlled functions from being performed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. In a digital radio transceiver of the type including interchangeable user control arrangements disposed on an outer surface of a housing, said transceiver including digitally controlled circuitry disposed within said housing, a method of preventing someone from obtaining additional transceiver functionality by substituting user control arrangements, said method including the following steps:

(a) substantially irreversibly modifying said transceiver from outside of said housing so as to specify a particular user control arrangement, said particular user control arrangement having a corresponding set of functions associated therewith;

(b) detecting the particular user control arrangement specified by said substantially irreversible modification; and (c) disabling said digitally controlled circuitry from performing any functions other than said corresponding set of functions associated with said particular user control arrangement in response to said detected specified arrangement.

2. A method as in claim 1 wherein said step (a) includes the step of providing a modification encoding any one of more than two possible modification states, each of said modification states corresponding to a different particular user control arrangement.

3. A method as in claim 1 Wherein said detecting step (b) includes the step of electrically detecting said modification.

4. A method as in claim 1 wherein:

said modifying step (a) includes the step of altering the conductivity of at least one electrical pathway within said digitally controlled circuitry without creating any additional entry points into said housing;

said transceiver is of the type which periodically scans the state of controls within said control arrangement disposed on said housing outer surface; and said periodic control state scanning includes the further step of scanning the conductivity state of said at least one electrical pathway.

5. A digital radio transceiver including:

a housing having an outer surface;

digitally controlled circuitry disposed within said housing;

a user control arrangement disposed on an outer surface of a housing, said control arrangements cooperating with said digitally controlled circuitry to actuate a set of functions corresponding to said user control arrangement;

substantially irreversibly modifiable indicating means coupled to said digitally controlled circuitry for being modified from outside of said housing, said indicating means having a state specifying said set of functions corresponding to said user control arrangement;

said digitally controlled circuitry including:

means coupled to said indicating means for detecting the state of said indicating means, and means for preventing said digitally controlled circuitry from performing any functions other than said corresponding set of functions associated with said particular user control arrangement in response to said detected state.

6. A digital transceiver final assembly kit comprising:

a first user control arrangement having a first set of enhanced functions associated therewith;

a second user control arrangement having associated therewith a second set of enhanced functions different from said first set of functions; and a basic transceiver unit comprising:

a housing having an outer surface, digitally controlled circuitry disposed within said housing, said digitally controlled circuit being preprogrammed to perform said first and said second sets of enhanced functions;

means disposed on an outer surface of said housing for interchangeably coupling either of said first and second control arrangements to said digitally controlled circuitry and for providing cooperation between said said digitally controlled circuitry and said coupled control arrangement, and irreversible means coupled to said digitally controlled circuitry for storing a state substantially irreversibly changeable from outside of said housing, for permitting said digitally controlled circuitry to perform one of said first and second set of functions, and for inhibiting said digitally controlled circuitry from performing the other of said first and second set of functions.

7. A kit as in claim 6 wherein:

said housing defines a hole therethrough; and said digitally controlled circuitry includes:

electrically conductive pathway means disposed in registry with said hole for providing electrical conductivity and for ceasing to provide electrical conductivity when severed by a sharp tool inserted into said hole, and means for selecting between said first and second set of functions in response to detected conductivity of said pathway means.

8. A kit as in claim 6 wherein said digitally controlled circuit means includes means for electrically detecting the state of said irreversible means.

9. A kit as in claim 6 wherein said irreversible means includes means for indicating first, second and third mutually exclusive states, said first state selecting said first set of functions, said second state selecting said second set of functions, said third state selecting neither of said first and second set of functions.

10. A method of assembly a radio transceiver comprising the following steps:

selecting an escutcheon plate assembly from among a plurality of different such assemblies, said plurality of different escutcheon plate assemblies providing a corresponding plurality of different control configurations, said plurality of different control configurations having associated therewith a corresponding plurality of different transceiver functionalities;

coupling said selected escutcheon plate assembly to a digital radio transceiver main unit adapted to interchangeably receive any one of said plurality of different escutcheon plate assemblies; and substantially irreversibly modifying said digital radio transceiver main unit, including the step of inserting a sharp tool into a hole defined through the housing of said main unit; and inhibiting said radio transceiver from performing any functionalities other than the functionality associated with said selected escutcheon plate assembly in response to said substantially irreversible modification.

* * * * *